US012670906B2

(12) United States Patent
Teruuchi

(10) Patent No.: US 12,670,906 B2
(45) Date of Patent: Jun. 30, 2026

(54) VEHICULAR RECORDING CONTROL DEVICE AND RECORDING METHOD

(71) Applicant: JVCKENWOOD Corporation, Yokohama (JP)

(72) Inventor: Takuji Teruuchi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 203 days.

(21) Appl. No.: 18/442,565

(22) Filed: Feb. 15, 2024

(65) Prior Publication Data

US 2024/0185854 A1 Jun. 6, 2024

Related U.S. Application Data

(63) Continuation of application No. PCT/JP2022/011873, filed on Mar. 16, 2022.

(30) Foreign Application Priority Data

Sep. 27, 2021 (JP) ................................. 2021-156788
Dec. 28, 2021 (JP) ................................. 2021-214915
Dec. 28, 2021 (JP) ................................. 2021-214916

(51) Int. Cl.
*G10L 15/22* (2006.01)
*G10L 15/25* (2013.01)
*G10L 25/63* (2013.01)

(52) U.S. Cl.
CPC .............. *G10L 15/22* (2013.01); *G10L 15/25* (2013.01); *G10L 25/63* (2013.01); *G10L 2015/223* (2013.01)

(58) Field of Classification Search
None
See application file for complete search history.

(56) References Cited

U.S. PATENT DOCUMENTS

2011/0083075 A1* 4/2011 MacNeille ............. B60K 35/10
381/26
2011/0105857 A1* 5/2011 Zhang .............. H04N 21/44218
600/300

(Continued)

FOREIGN PATENT DOCUMENTS

JP 2013-061858 A 4/2013
JP 2013-255168 A 12/2013

(Continued)

OTHER PUBLICATIONS

Kenwood, DRV-MR760, Search date Sep. 24, 2021, <https://www.kenwood.com/jp/car/drive-recorders/products/drv-mr760/>, with partial translation, in 5 pages.

*Primary Examiner* — Jonathan C Kim
(74) *Attorney, Agent, or Firm* — PROCOPIO, CORY, HARGREAVES & SAVITCH LLP

(57) ABSTRACT

A vehicular recording control device includes: an imaging data acquiring unit configured to acquire first imaging data from a first camera imaging surroundings of a host vehicle and second imaging data from a second camera imaging a cabin of the vehicle; a sightline determining unit configured to determine the direction of a sightline of an occupant of the vehicle from the second imaging data; a voice recognizing unit configured to recognize a voice command for instructing event recording; an output control unit configured to output information indicating the voice command to the occupant when the sightline determining unit determines that the sightline of the occupant is directed to a display unit; and a recording control unit configured to store the first imaging data as event data when the voice recognizing unit recognizes the voice command.

7 Claims, 8 Drawing Sheets

(56)         References Cited

U.S. PATENT DOCUMENTS

| | | | | |
|---|---|---|---|---|
| 2013/0030811 A1* | 1/2013 | Olleon | G06V 40/107 | |
| | | | 348/148 | |
| 2014/0350942 A1* | 11/2014 | Kady | G06F 3/038 | |
| | | | 704/275 | |
| 2015/0062168 A1* | 3/2015 | Ng-Thow-Hing | | |
| | | | G02B 27/0101 | |
| | | | 345/633 | |
| 2015/0340029 A1* | 11/2015 | Kunieda | G10L 15/083 | |
| | | | 704/249 | |
| 2015/0340030 A1* | 11/2015 | Sekiguchi | G06F 3/013 | |
| | | | 704/254 | |
| 2017/0235361 A1* | 8/2017 | Rigazio | B60K 35/235 | |
| | | | 715/710 | |
| 2018/0024626 A1* | 1/2018 | Sanger | G06V 40/175 | |
| | | | 463/13 | |
| 2019/0255995 A1* | 8/2019 | Friedman | B60K 28/02 | |
| 2020/0043459 A1* | 2/2020 | Itabashi | G10L 21/0208 | |
| 2020/0159366 A1* | 5/2020 | Matsuda | B60R 16/02 | |
| 2021/0287697 A1* | 9/2021 | Marti | G06V 20/597 | |
| 2023/0048330 A1* | 2/2023 | Huang | G06F 21/6245 | |
| 2023/0120080 A1* | 4/2023 | Duffy | G06V 20/44 | |
| | | | 701/23 | |
| 2024/0087561 A1* | 3/2024 | Pathak | G06F 3/013 | |
| 2024/0185854 A1* | 6/2024 | Teruuchi | G10L 15/25 | |

FOREIGN PATENT DOCUMENTS

| | | |
|---|---|---|
| JP | 2016-009202 A | 1/2016 |
| JP | 2020-154904 A | 9/2020 |

* cited by examiner

FIG. 2

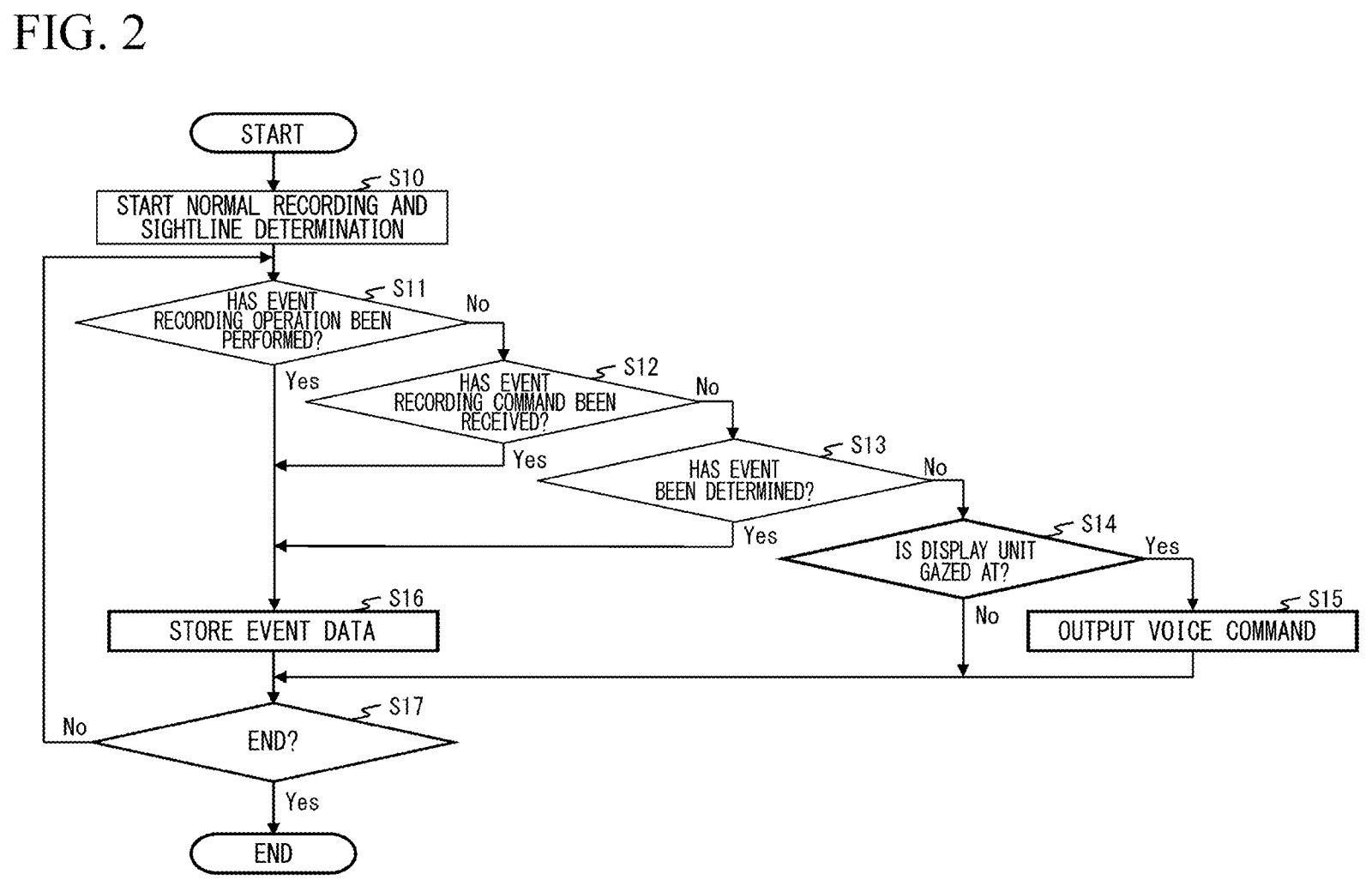

START

S10 — START NORMAL RECORDING AND SIGHTLINE DETERMINATION

S11 — HAS EVENT RECORDING OPERATION BEEN PERFORMED?
Yes
No

S12 — HAS EVENT RECORDING COMMAND BEEN RECEIVED?
Yes
No

S13 — HAS EVENT BEEN DETERMINED?
Yes
No

S14 — IS DISPLAY UNIT GAZED AT?
Yes
No

S15 — OUTPUT VOICE COMMAND

S16 — STORE EVENT DATA

S17 — END?
Yes
No

END

FIG. 3

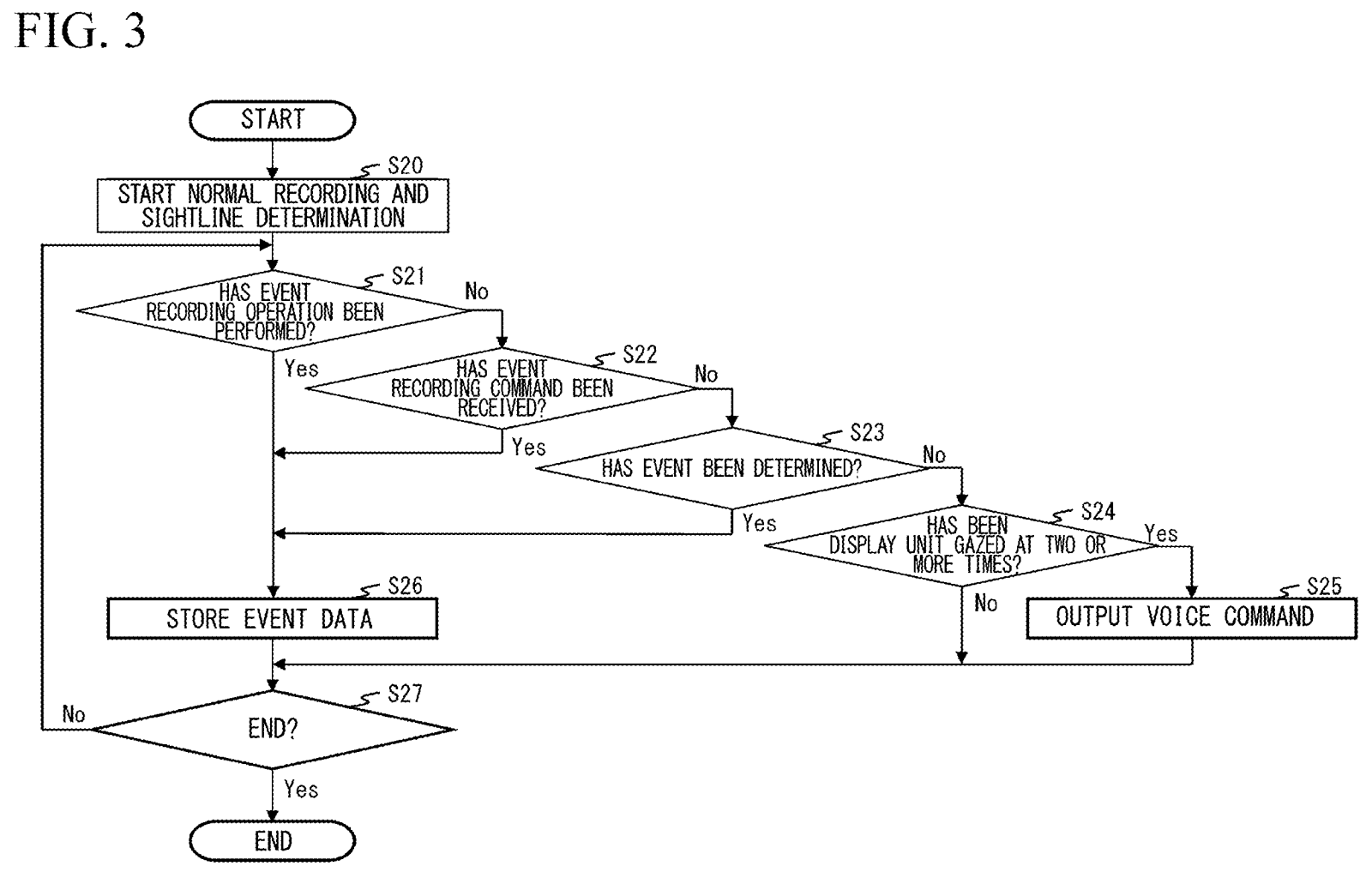

START

S20
START NORMAL RECORDING AND SIGHTLINE DETERMINATION

S21
HAS EVENT RECORDING OPERATION BEEN PERFORMED?
No / Yes

S22
HAS EVENT RECORDING COMMAND BEEN RECEIVED?
No / Yes

S23
HAS EVENT BEEN DETERMINED?
No / Yes

S24
HAS BEEN DISPLAY UNIT GAZED AT TWO OR MORE TIMES?
No / Yes

S25
OUTPUT VOICE COMMAND

S26
STORE EVENT DATA

S27
END?
No / Yes

END

FIG. 4

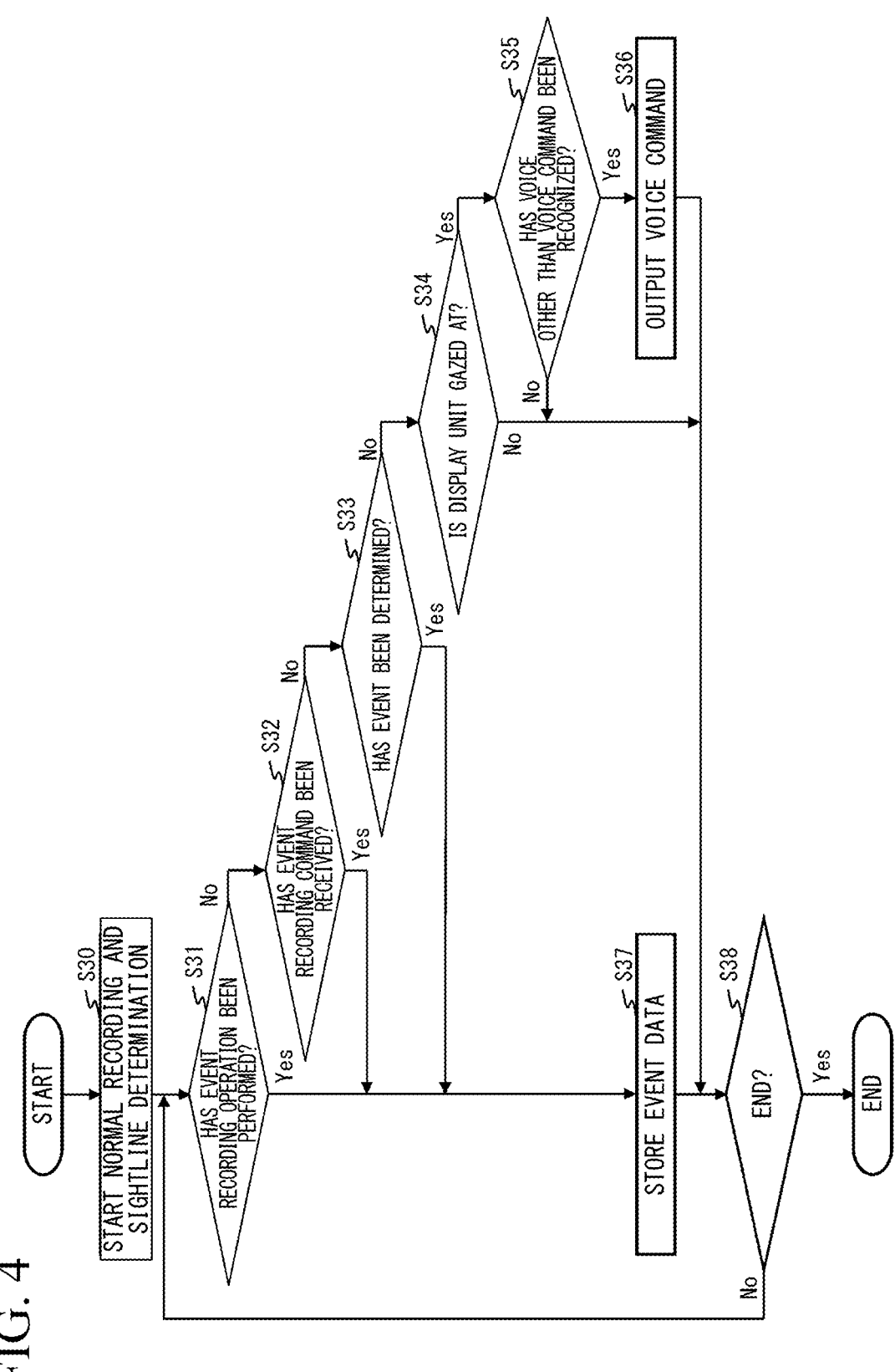

START

S30 START NORMAL RECORDING AND SIGHTLINE DETERMINATION

S31 HAS EVENT RECORDING OPERATION BEEN PERFORMED?
No → S32
Yes →

S32 HAS EVENT RECORDING COMMAND BEEN RECEIVED?
No → S33
Yes →

S33 HAS EVENT BEEN DETERMINED?
No → S34
Yes →

S34 IS DISPLAY UNIT GAZED AT?
Yes → S35
No →

S35 HAS VOICE OTHER THAN VOICE COMMAND BEEN RECOGNIZED?
Yes → S36
No →

S36 OUTPUT VOICE COMMAND

S37 STORE EVENT DATA

S38 END?
Yes → END
No →

FIG. 6

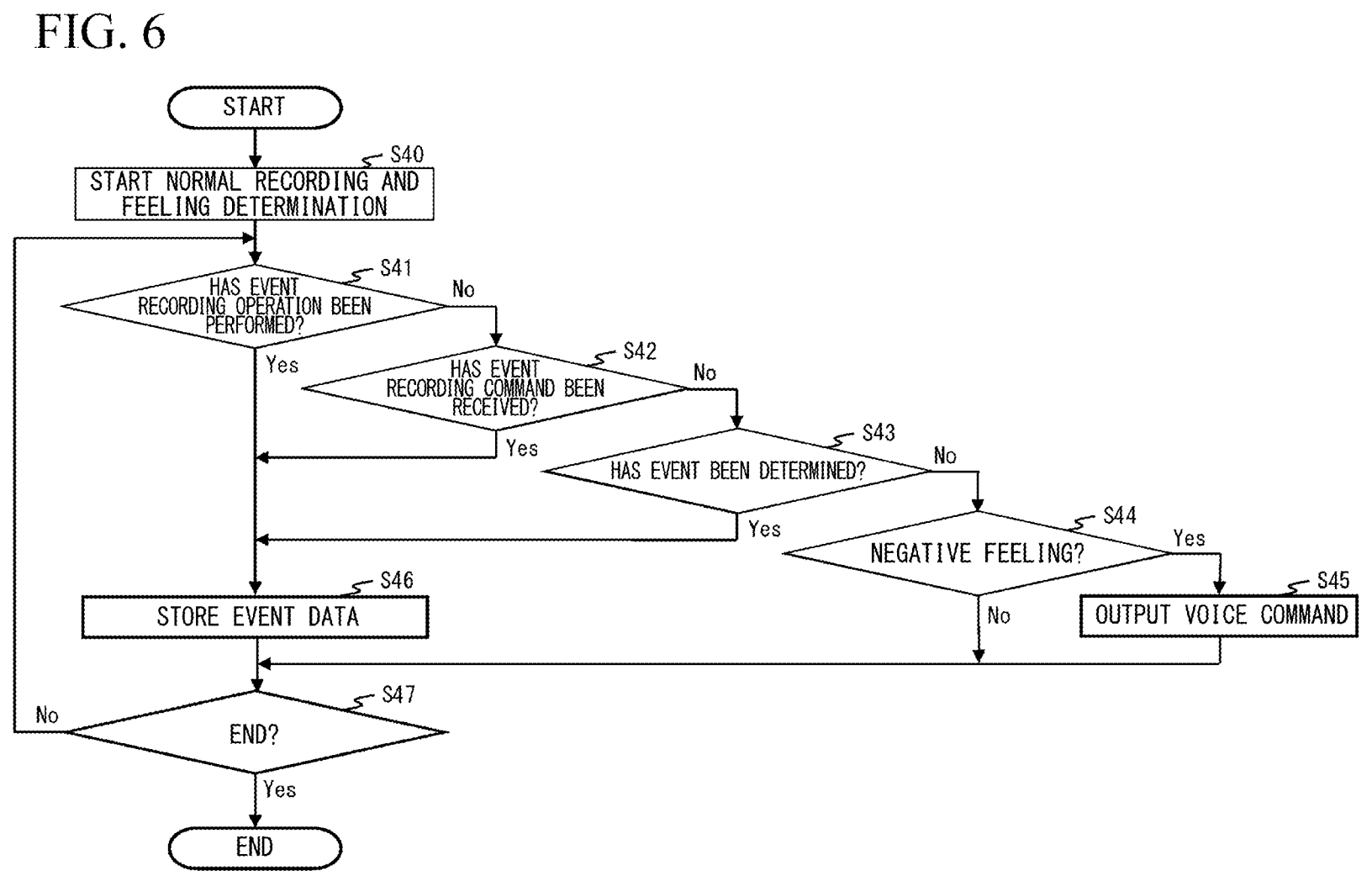

START

S40
START NORMAL RECORDING AND
FEELING DETERMINATION

S41
HAS EVENT
RECORDING OPERATION BEEN
PERFORMED?

No

Yes

S42
HAS EVENT
RECORDING COMMAND BEEN
RECEIVED?

No

Yes

S43
HAS EVENT BEEN DETERMINED?

No

Yes

S44
NEGATIVE FEELING?

Yes

No

S45
OUTPUT VOICE COMMAND

S46
STORE EVENT DATA

S47
END?

Yes

No

END

FIG. 8

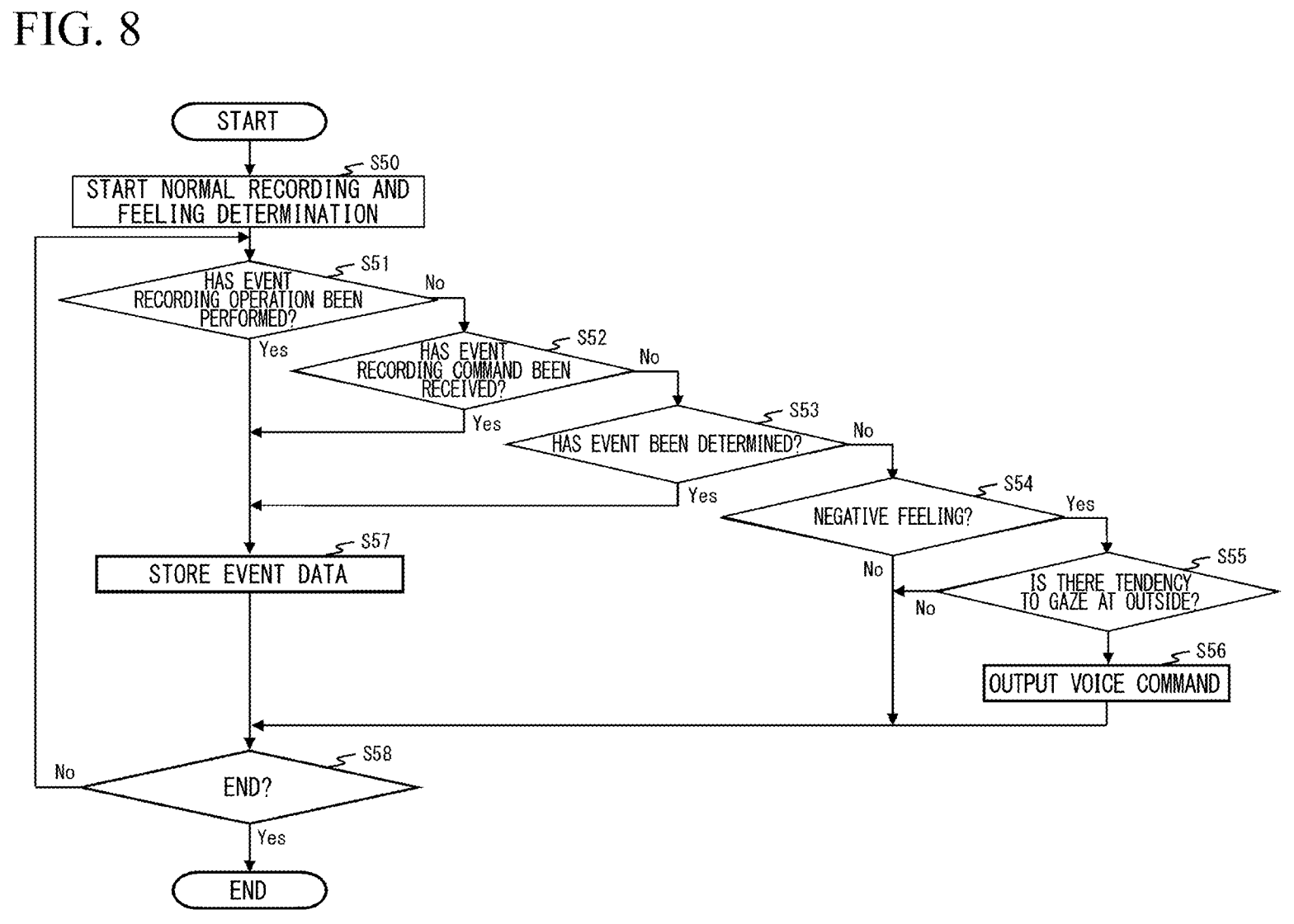

START

S50 START NORMAL RECORDING AND FEELING DETERMINATION

S51 HAS EVENT RECORDING OPERATION BEEN PERFORMED?
No / Yes

S52 HAS EVENT RECORDING COMMAND BEEN RECEIVED?
No / Yes

S53 HAS EVENT BEEN DETERMINED?
No / Yes

S54 NEGATIVE FEELING?
No / Yes

S55 IS THERE TENDENCY TO GAZE AT OUTSIDE?
No / Yes

S56 OUTPUT VOICE COMMAND

S57 STORE EVENT DATA

S58 END?
No / Yes

END

VEHICULAR RECORDING CONTROL DEVICE AND RECORDING METHOD

CROSS REFERENCE TO RELATED APPLICATION

THIS APPLICATION IS A BYPASS CONTINUATION OF INTERNATIONAL APPLICATION NO. PCT/JP2022/011873, FILED Mar. 16, 2022, WHICH PRIORITY IS CLAIMED ON JAPANESE PATENT APPLICATION NO. 2021-156788, FILED Sep. 27, 2021, JAPANESE PATENT APPLICATION NO. 2021-214915, FILED Dec. 28, 2021, AND JAPANESE PATENT APPLICATION NO. 2021-214916, FILED Dec. 28, 2021, THE CONTENT OF WHICH IS INCORPORATED HEREIN BY REFERENCE.

TECHNICAL FIELD

The present invention relates to a vehicular recording control device and a recording method and more particularly to a vehicular recording control device and a recording method which are used in a vehicle such as an automobile.

BACKGROUND

Some vehicular recording devices, so-called drive recorders, perform event recording using a voice command in addition to determination of an impact using an acceleration sensor (for example, see Non-Patent Document 1). Event recording using a voice command enables safe event recording without requiring an operation of a touch panel or the like during driving when an accident in which a user is not involved is recorded or the like. Patent Document 1 discloses a drive recorder that performs event recording by giving voice instructions for determination of an event based on acceleration.

CITATION LIST

Patent Document

[Patent Document 1]
  Japanese Unexamined Patent Application, First Publication No. 2020-154904

Non Patent Document

[Non Patent Document 1]
  DRV-MR760 [accessed Sep. 24, 2021], Internet <https://www.kenwood.com/jp/car/drive-recorders/products/drv-mr760/>

SUMMARY

When a function of recording an event using a voice command is provided in a drive recorder, there are fewer opportunities for event recording and thus it may be instantaneously determined what voice command is used for event recording. Alternatively, an operation based on a voice command may not be performed because a similar word or phrase is erroneously uttered. In this case, safety may be damaged because the timing at which event recording is performed is missed or a driver of a vehicle manually performs an operation for event recording during driving of the vehicle.

An embodiment provides a vehicular recording control device and a recording method that can appropriately perform event recording using a voice command.

According to an embodiment, there is provided a vehicular recording control device including: an imaging data acquiring unit configured to acquire first imaging data from a first camera imaging surroundings of a vehicle and second imaging data from a second camera imaging a cabin of the vehicle; a sightline determining unit configured to determine the direction of a sightline of an occupant of the vehicle from the second imaging data; a voice recognizing unit configured to recognize a voice command for instructing event recording; an output control unit configured to output information indicating the voice command to the occupant when the sightline determining unit determines that the sightline of the occupant is directed to a display unit; and a recording control unit configured to store the first imaging data as event data when the voice recognizing unit recognizes the voice command.

According to an embodiment, there is provided a vehicular recording control device including: an imaging data acquiring unit configured to acquire first imaging data from a first camera imaging surroundings of a vehicle; a feeling determining unit configured to determine the feeling of an occupant of the vehicle; a voice recognizing unit configured to recognize a voice command for instructing event recording; an output control unit configured to output information indicating the voice command to the occupant when the feeling determining unit determines that the feeling of the occupant is negative; and a recording control unit configured to store the first imaging data as event data when the voice recognizing unit recognizes the voice command.

According to an embodiment, there is provided a recording method that is performed by a vehicular recording control device, the recording method including: an imaging data acquiring step of acquiring first imaging data from a first camera imaging surroundings of a vehicle and second imaging data from a second camera imaging a cabin of the vehicle; a sightline determining step of determining a direction of a sightline of an occupant of the vehicle from the second imaging data; a voice recognizing step of recognizing a voice command for instructing event recording; an output step of outputting information indicating the voice command to the occupant when it is determined that the sightline of the occupant is directed to a display unit; and a recording step of storing the first imaging data as event data when the voice command is recognized.

According to an embodiment, there is provided a recording method that is performed by a vehicular recording control device, the recording method including: an imaging data acquiring step of acquiring first imaging data from a first camera imaging surroundings of a vehicle; a feeling determining step of determining a feeling of an occupant of the vehicle; a voice recognizing step of recognizing a voice command for instructing event recording; an output control step of outputting information indicating the voice command to the occupant when it is determined in the feeling determining step that the feeling of the occupant is negative; and a recording control step of storing the first imaging data as event data when the voice command is recognized in the voice recognizing step.

According to the embodiments, it is possible to appropriately perform event recording using a voice command.

BRIEF DESCRIPTION OF THE DRAWINGS

FIG. 2 is a flowchart illustrating an example of a process flow which is performed by a vehicular recording control device according to the first embodiment.

FIG. 3 is a flowchart illustrating an example of a process flow which is performed by a vehicular recording control device according to a second embodiment.

FIG. 4 is a flowchart illustrating an example of a process flow which is performed by a vehicular recording control device according to a third embodiment.

FIG. 6 is a flowchart illustrating an example of a process flow which is performed by a vehicular recording control device according to the fourth embodiment.

FIG. 8 is a flowchart illustrating an example of a process flow which is performed by a vehicular recording control device according to the fifth embodiment.

DETAILED DESCRIPTION

First Embodiment

Hereinafter, embodiments will be described with reference to the accompanying drawings. In the following description, a drive recorder used in a vehicle which is a mobile object is described as an example of a vehicular recording device according to the embodiments. However, the present invention is not limited thereto. For example, the present invention can be applied to various vehicles such as a motor bike or a bicycle or various mobile objects such as a train, a ship, a robot, and a person. The present invention is not limited to the following embodiments.

Figure 1:
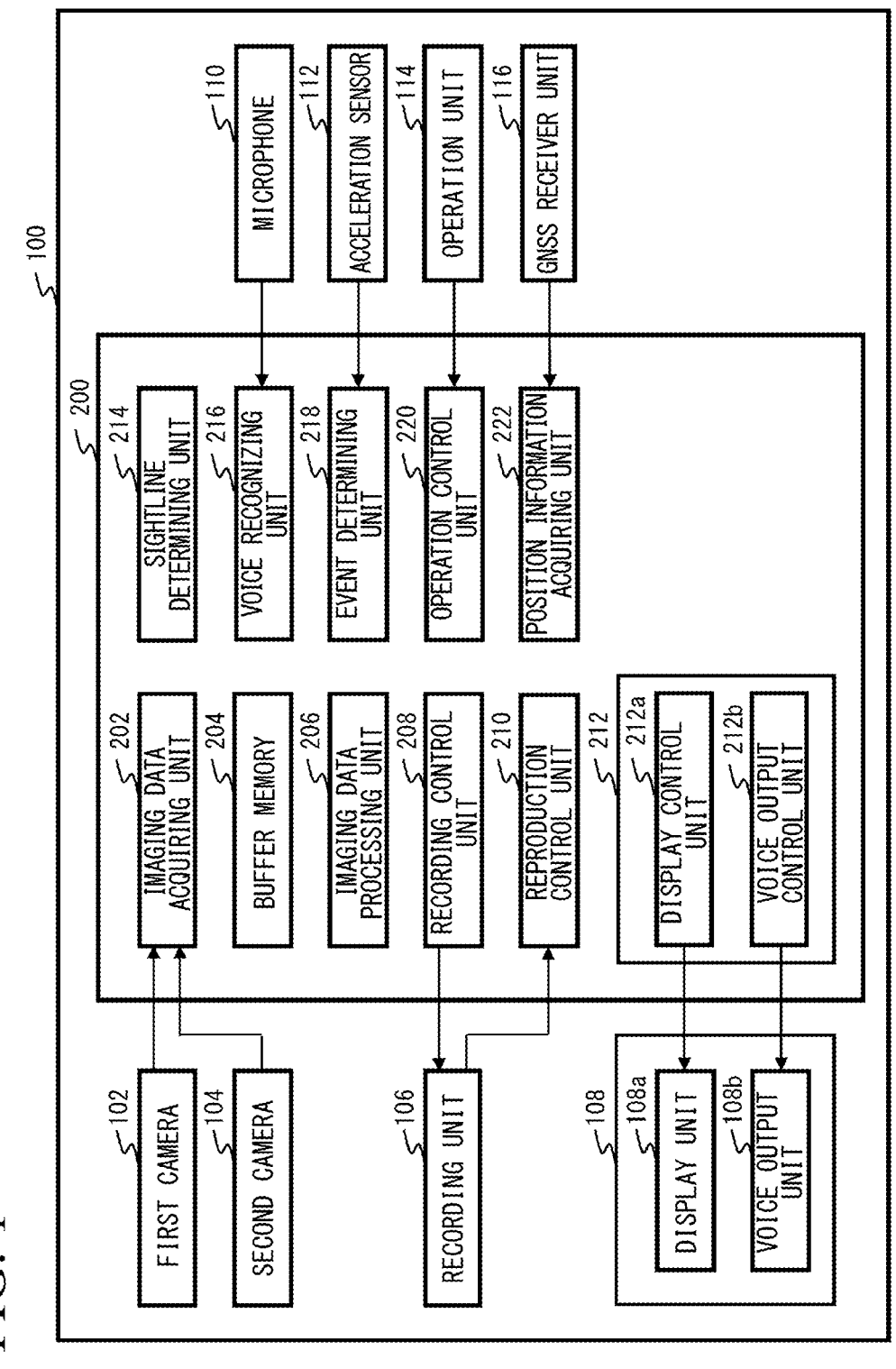
FIG. 1 is a block diagram illustrating a configuration of a vehicular recording device according to a first embodiment.

A first embodiment will be described below with reference to FIGS. 1 and 2. FIG. 1 is a block diagram illustrating a configuration of a vehicular recording device 100 according to the first embodiment. The vehicular recording device 100 is a so-called drive recorder. The vehicular recording device 100 is attached to an upper part of a windshield of a vehicle, determines an impact corresponding to an accident, that is, acceleration corresponding to the accident applied to the vehicle, and stores an image when the accident has been determined or the like as event data.

The vehicular recording device 100 illustrated in FIG. 1 is not limited to a simple device attached to a vehicle, but can employ various configurations such as a configuration which is realized by functions of a navigation device or a configuration which is attached in advance to a vehicle.

In FIG. 1, the vehicular recording device 100 includes a control unit 200 which is a vehicular recording control device, a first camera 102, a second camera 104, a recording unit 106, an output unit 108, a microphone 110, an acceleration sensor 112, an operation unit 114, and a global navigation satellite system (GNSS) receiver unit 116. The output unit 108 includes a display unit 108a and a voice output unit 108b.

The control unit 200 includes one or more central processing unit (CPUs) performing various types of data processing, a graphics processing unit (GPU), and a random access memory (RAM) and performs various processes in accordance with a program. The control unit 200 includes at least an imaging data acquiring unit 202, a buffer memory 204, an imaging data processing unit 206, a recording control unit 208, a reproduction control unit 210, an output control unit 212, a sightline determining unit 214, a voice recognizing unit 216, an event determining unit 218, an operation control unit 220, and a position information acquiring unit 222 as constituents or functions to be realized. The output control unit 212 includes a display control unit 212a and a voice output control unit 212b.

The control unit 200 is a vehicular recording control device that performs a recording method according to the present invention and is a computer operating a program according to the present invention.

The first camera 102 images the surroundings of a vehicle which is a mobile object. The first camera 102 may be provided integrally with the vehicular recording device 100 or may be connected thereto as a separate unit in a wired or wireless manner. Although not illustrated, the first camera 102 includes a lens, an imaging element, and an analog-to-digital (AD) conversion element. The first camera 102 outputs first imaging data acquired by the imaging to the imaging data acquiring unit 202.

The first camera 102 is provided on a windshield side of the vehicular recording device 100 when the vehicular recording device 100 is provided in a cabin side of an upper part of the windshield of the vehicle and is provided integrally with the vehicular recording device 100.

The first camera 102 is not limited to a single camera but may include a plurality of cameras. For example, the first camera includes all of a plurality of cameras in an arbitrary combination imaging a front view, a rear view, a side view, and a cabin of the vehicle.

The second camera 104 images the cabin of the vehicle which is a mobile object. The second camera 104 may be provided integrally with the vehicular recording device 100 or may be connected thereto as a separate unit in a wired or wireless manner. Although not illustrated, the second camera 104 includes a lens, an imaging element, and an AD conversion element. The second camera 104 outputs second imaging data acquired by the imaging to the imaging data acquiring unit 202.

The second camera 104 is provided at a position at which a face of an occupant of the vehicle can be imaged and a sightline of the occupant of the vehicle can be determined. The second camera 104 is provided on a cabin side of the vehicular recording device 100 when the vehicular recording device 100 is provided in the cabin side of an upper part of the windshield of the vehicle and is provided integrally with the vehicular recording device 100.

When the second camera 104 is provided at a position at which a sightline of a driver who is an occupant of the vehicle can be determined, the second camera 104 is provided, for example, in an instrument panel of the vehicle to capture an image in a direction in which a face of the driver in the vehicle is located. When the second camera 104 is provided at a position at which a sightline of another occupant in addition to the driver of the vehicle can be determined, the second camera 104 may be provided, for example, in the vicinity of or in a rearview mirror or the like of the vehicle to image the whole cabin.

The second camera 104 is not limited to a single camera but may include a plurality of cameras. The second camera 104 may be a camera for capturing an image in a visible range, a camera for capturing an image in an infrared range, or a combination thereof.

In FIG. 1, the first camera 102 and the second camera 104 are illustrated as different cameras, but, for example, when an imaging range imaged by the first camera 102 and the second camera 104 can be imaged by a single camera, the single camera may be used. The single camera is, for example, an omnidirectional camera that can capture an image at 180 degrees or 360 degrees.

Imaging data acquired from the first camera 102 and the second camera 104 is moving image data. This imaging data may include voice data in addition to moving image data.

The recording unit 106 is a nonvolatile memory that records the first imaging data from the first camera 102 under the control of the recording control unit 208 and is, for example, a memory card. The first imaging data and event data recorded by the recording unit 106 are reproduced under the control of the reproduction control unit 210. The recording unit 106 may be replaced with a separate recording and reproduction device including the recording control unit 208 and the reproduction control unit 210 in addition to the recording unit 106. The recording unit 106 may be provided integrally with the recording and reproduction device or may be connected thereto as a separate unit in a wired or wireless manner.

The output unit 108 outputs information indicating a voice command to an occupant of the vehicle. The output unit 108 includes the display unit 108a and the voice output unit 108b. When the display unit 108a serves as the output unit 108, the display unit 108a performs display of information such as text information indicating a voice command to the display unit 108a as an output of information indicating the voice command to an occupant of the vehicle. When the voice output unit 108b serves as the output unit 108, the voice output unit 108b outputs a voice indicating a voice command.

The display unit 108a is a display device that displays various types of information under the control of the display control unit 212a. The display unit 108a includes a display panel such as a liquid crystal panel or an organic electroluminescence (EL) panel. The display unit 108a may be provided integrally with the vehicular recording device 100 or may be connected thereto as a separate unit in a wired or wireless manner. The display unit 108a may be another device that is connected in a wireless manner and includes the display control unit 212a. The display unit 108a is disposed at a position at which it is easy for an occupant of the vehicle to see.

When the vehicular recording device 100 is provided on the cabin side of an upper part of the windshield of the vehicle and the display unit is provided integrally with the vehicular recording device 100, the display unit 108a is provided on the cabin side of the vehicular recording device 100. In this case, the display unit 108a is provided in the vicinity of the second camera 104.

The voice output unit 108b outputs various types of voices under the control of the voice output control unit 212b. Specifically, the voice output unit 108b includes a voice amplifier and a speaker. The voice output unit 108b outputs the same voice as a voice command as information indicating the voice command to an occupant of the vehicle.

When information indicating a voice command is output, the voice output unit 108b performs the output in such a way that the output voice is not erroneously recognized as a voice command. Accordingly, the voice output unit 108b is configured to output a voice that is easy for an occupant of the vehicle to understand and which is not input to the microphone 110. The voice output unit 108b is, for example, a speaker provided above a seat on which an occupant of the vehicle sits. The voice output unit 108b is a neck speaker which is worn by an occupant of the vehicle.

The microphone 110 acquires a voice uttered by an occupant such as a driver of the vehicle. The microphone 110 may be provided in the second camera 104, and a voice uttered by an occupant such as a driver of the vehicle may be included in the second imaging data. The microphone 110 is disposed at a position at which a voice uttered by an occupant such as a driver of the vehicle can be acquired. The microphone 110 may have directivity with which a voice uttered by an occupant such as a driver of the vehicle can be acquired.

The acceleration sensor 112 determines acceleration which is applied to the vehicular recording device 100 or the vehicle. The acceleration sensor 112 is, for example, a three-axis acceleration sensor and determines acceleration in a longitudinal direction of the vehicle which is an x-axis direction, a lateral direction of the vehicle which is a y-axis direction, and a vertical direction of the vehicle which is a z-axis direction. The acceleration sensor 112 outputs determined acceleration information to the event determining unit 218. The acceleration sensor 112 may be provided integrally with the vehicular recording device 100 or may be connected thereto as a separate unit in a wired or wireless manner. The acceleration sensor 112 may be provided as a separate unit including the acceleration sensor 112 and the event determining unit 218.

The operation unit 114 is an interface that receives an operation on the vehicular recording device 100 and outputs received operation information to the operation control unit 220. The operation unit 114 is various buttons provided in the vehicular recording device 100 or a touch panel provided in the display unit 108a and receives an operation from a user. The operation unit 114 may receive an operation from another device connected thereto in a wireless manner. The operation unit 114 receives, for example, an operation of starting event recording from a user. The operation unit 114 receives an operation of reproducing event data from a user.

The GNSS receiver unit 116 includes, for example, a receiver device and an antenna receiving signals from global positioning system (GPS) satellites or the like. The GNSS receiver unit 116 outputs received signals to the position information acquiring unit 222. The GNSS receiver unit 116 may be provided integrally with the vehicular recording device 100 or may be connected thereto as a separate unit in a wired or wireless manner. The GNSS receiver unit 116 may be a separate unit which is another device including the GNSS receiver unit 116 and the position information acquiring unit 222.

The imaging data acquiring unit 202 acquires the first imaging data from the first camera 102 and the second imaging data from the second camera 104. The imaging data acquiring unit 202 outputs the first imaging data acquired from the first camera 102 to the buffer memory 204. The imaging data acquiring unit 202 outputs the second imaging data acquired from the second camera 104 to the sightline determining unit 214.

The imaging data acquiring unit 202 also has a function of an imaging control unit that controls imaging using the first camera 102 and the second camera 104. The imaging data acquiring unit 202 causes the first camera 102 and the second camera 104 to capture an image in a period in which the vehicular recording device 100 is operating as needed.

The buffer memory 204 is an internal memory that is provided in the control unit 200 and updates and temporarily stores imaging data of a predetermined time acquired by the imaging data acquiring unit 202.

The imaging data processing unit 206 converts the imaging data temporarily stored in the buffer memory 204 to an arbitrary file format such as an MP4 format encoded by a codec of an arbitrary system such as H.264 or moving picture experts group (MPEG)-4. The imaging data processing unit 206 generates imaging data of a file corresponding to a predetermined time from the imaging data temporarily stored in the buffer memory 204. Specifically, the imaging data processing unit 206 generates imaging data of 60 seconds in the imaging order as a file from the imaging data temporarily stored in the buffer memory 204. The imaging data processing unit 206 outputs the generated imaging data to the recording control unit 208. The imaging data processing unit 206 outputs the generated imaging data to the display control unit 212*a*. The period of the imaging data generated as a file is, for example, 60 seconds, but is not limited thereto.

The recording control unit 208 performs control for causing the recording unit 106 to record the imaging data made into a file by the imaging data processing unit 206. The recording control unit 208 records the imaging data made into a file by the imaging data processing unit 206 as over-writable imaging data on the recording unit 106 in the period in which the vehicular recording device 100 is operating. When a recording capacity of the recording unit 106 reaches an upper limit, the recording control unit 208 records new imaging data by overwriting from a recording area in which old imaging data is recorded out of the over-writable imaging data recorded on the recording unit 106. The imaging data which is recorded on the recording unit 106 by the recording control unit 208 is the first imaging data acquired from the first camera 102.

The recording control unit 208 continuously records imaging data based on the first imaging data on the recording unit 106 in the period in which the vehicular recording device 100 is operating. This recording process is referred to as normal recording or loop recording.

When the event determining unit 218 determines that an event has occurred, the recording control unit 208 stores the first imaging data in a predetermined period including an event occurrence time point as overwriting-prohibited event data. The event data is, for example, imaging data in 15 seconds before and after the event occurrence time point.

When the operation control unit 220 receives an operation of performing event recording, the recording control unit 208 stores the first imaging data in a predetermined period including a time point at which the operation of performing event recording has been performed as overwriting-prohibited event data. The event data is, for example, imaging data in 15 seconds before and after the time point at which the operation of performing event recording has been performed.

When the voice recognizing unit 216 recognizes a voice command for performing event recording, the recording control unit 208 stores the first imaging data in a predetermined period including a time point at which the voice command for performing event recording has been recognized as overwriting-prohibited event data. The event data is, for example, imaging data in 15 seconds before and after the time point at which the voice command for performing event recording has been recognized.

A method of storing event data which is performed by recording control unit 208 is arbitrary. For example, an overwriting-prohibition flag is added to a header, a payload, or the like of a section in which overwriting is prohibited in the first imaging data, and the resultant is stored in the recording unit 106. The overwriting-prohibited section in the first imaging data is stored in an overwriting-prohibited area of the recording unit 106. Alternatively, the overwriting-prohibited section in the first imaging data is transmitted to another device and stored therein.

The reproduction control unit 210 performs control for reproducing the imaging data and the event data recorded on the recording unit 106. The reproduction control unit 210 performs reproduction of overwriting-prohibited event data in addition to reproduction of over-writable imaging data recorded on the recording unit 106 and outputs the reproduction result to the display control unit 212*a*.

The output control unit 212 performs a process of outputting various types of information to an occupant of the vehicle. Specifically, when a feeling determining unit 224 determines that a feeling of an occupant of the vehicle is negative, the output control unit 212 outputs information indicating a voice command to the occupant. The output control unit 212 includes the display control unit 202*a* and the voice output control unit 212*b*.

The display control unit 212*a* controls the display unit 108*a* such that various types of information is displayed on the display unit 108*a*. When the display control unit 212*a* serves as the output control unit 212 and the sightline determining unit 214 determines that a sightline of an occupant is directed to the display unit 108*a*, the display control unit 212*a* displays information indicating a voice command for instructing event recording on the display unit 108*a*. When the voice command for instructing event recording is "recording start," the display control unit 212*a* displays information indicating the voice command such as "recording start" or "ROKUGAISHI" on the display unit 108*a*.

When the sightline determining unit 214 determines that the sightline of the occupant is directed to the vehicular recording device 100, the display control unit 212*a* may display information indicating the voice command for instructing event recording on the display unit 108*a*. For example, this configuration is effective when the display unit 108 is provided integrally with the vehicular recording device 100.

In addition to the function of the output control unit 212, the display control unit 212*a* may display first image data acquired by the imaging data acquiring unit 202 on the display unit 108*a*. In this case, an image captured by the first camera 102 is displayed on the display unit 108*a*. The display control unit 212*a* displays imaging data or event data reproduced by the reproduction control unit 210 on the display unit 108*a*.

The voice output control unit 212*b* causes the voice output unit 108*b* to output various types of voices. When the voice output control unit 212*b* serves as the output control unit 212 and the sightline determining unit 214 determines that the sightline of the occupant is directed to the display unit 108*a*, the voice output control unit 212*b* causes the voice output unit 108*b* to output a voice indicating a voice command for instructing event recording. When the voice command for instructing event recording is "recording start," the voice output control unit 212*b* causes the voice output unit 108*b* to output a voice such as "ROKUGAISHI."

In addition to the function of the output control unit 212, the voice output control unit 212*b* causes the voice output unit 108*b* to output a voice included in the imaging data or the event data reproduced by the reproduction control unit 210.

The sightline determining unit 214 determines a direction of a sightline of an occupant of the vehicle from the second imaging data acquired from the imaging data acquiring unit 202. When the second camera 104 is provided to image a driver of the vehicle, the sightline determining unit 214 determines a direction of a sightline of the driver in the vehicle captured in the second imaging data. When the second camera 104 is provided at a position at which the whole cabin can be imaged and an occupant other than the driver is in the vehicle, the sightline determining unit 214 determines a direction of a sightline of an occupant other than the driver in addition to determination of the direction of the sightline of the driver in the vehicle.

The sightline determining unit 214 determines a face of a person from the second imaging data and determines a position of an eye in the determined face. Determination of a face or an eye by the sightline determining unit 214 is performed using an arbitrary method such as pattern matching. The sightline determining unit 214 performs determination of a sightline direction based on a positional relationship between an eye inner corner and an iris determined from an image of eyes or determination of a sightline direction based on a positional relationship between corneal reflection and pupils. The sightline determining method is not limited to the aforementioned method, and can employ an arbitrary method.

The sightline determining unit 214 determines that a sightline of an occupant of the vehicle is directed to the display unit 108a. The sightline determining unit 214 determines that a sightline of an occupant of the vehicle is directed to the display unit 108a on the basis of data indicating a positional relationship between the second camera 104 and the display unit 108a stored in advance. In other words, the sightline determining unit 214 determines that an occupant of the vehicle gazes at the display unit 108a. Accordingly, the sightline determining unit 214 may determine that the sightline of an occupant of the vehicle is directed to the display unit 108a for a predetermined time or longer. In this case, the predetermined time is set to, for example, a time in which it can be determined that the occupant gazes at the display unit 108a, not a time in which the direction of the sightline of the occupant passes through the display unit 108a, such as 0.5 seconds.

The sightline determining unit 214 may determine that the sightline of the occupant of the vehicle is directed to the vehicular recording device 100. For example, this configuration is effective when the display unit 108a is provided integrally with the vehicular recording device 100.

The voice recognizing unit 216 analyzes a voice acquired by the microphone 110 and recognizes voice content. The voice recognizing unit 216 performs acoustic model analysis for each phoneme or each word on the voice acquired by the microphone 110 and recognizes voice content by performing comparison with a phoneme model or a language model. The voice recognizing unit 216 recognizes a voice command for the vehicular recording device 100. The voice command recognized by the voice recognizing unit 216 is, for example, "recording start" which is a voice command for performing event recording or "image capturing" which is a voice command for capturing a still image.

When it is determined that phonemes continuously indicate "ROKUGAISHI" through phoneme model analysis of the voice acquired by the microphone 110, the voice recognizing unit 216 receives the voice command "recording start" and outputs an instruction for performing event recording to the recording control unit 208.

The event determining unit 218 acquires acceleration information determined by the acceleration sensor 112 and determines that an event is determined when acceleration corresponding to the event has been determined. The acceleration corresponding to the event is acceleration corresponding to acceleration at which another object such as another vehicle has collided with the vehicle in which the vehicular recording device 100 is mounted. Determination of acceleration corresponding to an event may be performed with weighting in the x-axis direction, the y-axis direction, and the z-axis direction. When it is determined that an event has been determined, the event determining unit 218 outputs an instruction for performing event recording to the recording control unit 208.

The operation control unit 220 acquires operation information received by the operation unit 114 and outputs an operation instruction based on the operation information to the constituents. When an operation on a button or an icon for performing event recording is received from the operation unit 114, the operation control unit 220 outputs an instruction for performing event recording to the recording control unit 208. The operation control unit 220 acquires operation information indicating various setting operations of the vehicular recording device 100 such as operations of selecting, reproducing, deleting, and pausing event data or the like in addition and instructs to perform a process corresponding to the acquired operation information.

The position information acquiring unit 222 calculates current position information of the vehicle using a known method on the basis of radio waves received by the GNSS receiver unit 116. The position information calculated by the position information acquiring unit 222 is recorded along with the imaging data or the event data by the recording control unit 208.

A flow of a recording process which is performed by the vehicular recording device 100 will be described below with reference to FIG. 2. The recording process performed by the vehicular recording device 100 is performed on the basis of a program by a control unit 200 which is a computer serving as the vehicular recording control device.

Start of a process in FIG. 2 means that the vehicular recording device 100 starts its operation, for example, by turning on an engine or a power supply of a vehicle which is a mobile object.

When the process is started, the vehicular recording device 100 starts a normal recording process and a sightline determining process (Step S10). Specifically, the recording control unit 208 starts the normal recording process of recording imaging data based on first imaging data on the recording unit 106, and the sightline determining unit 214 starts determination of a direction of an occupant of the vehicle from second imaging data.

When the process of Step S10 is started, the vehicular recording device 100 determines whether an operation for performing event recording has been performed (Step S11). Specifically, the operation control unit 220 determines whether an operation on a button or an icon for performing event recording is received by the operation unit 114. When it is determined that an operation for performing event recording has been performed (Step S11: YES), the process flow proceeds to Step S16. When it is determined that an operation for performing event recording has not been performed (Step S11: NO), the process flow proceeds to Step S12.

In Step S12, the vehicular recording device 100 determines whether a voice command for performing event recording has been received. Specifically, the voice recognizing unit 216 determines whether a voice indicating the voice command for performing event recording is included in a voice acquired by the microphone 110. When it is determined that a voice command for performing event recording has been received (Step S12: YES), the process flow proceeds to Step S16. When it is determined that a voice command for performing event recording has not been received (Step S12: NO), the process flow proceeds to Step S14.

In Step S13, the vehicular recording device 100 determines whether an event has been determined. Specifically, the event determining unit 218 determines whether an event has been determined on the basis of acceleration determined by the acceleration sensor 112. When it is determined that an event has been determined (Step S13: YES), the process flow proceeds to Step S16. When it is determined that an event has not been determined (Step S13: NO), the process flow proceeds to Step S14.

In Step S14, the vehicular recording device 100 determines whether an occupant of the vehicle has gazed at the display unit 108a. Specifically, the sightline determining unit 214 determines whether a sightline of the occupant of the vehicle is directed to the display unit 108a. The sightline determining unit 214 may determine whether the sightline of the occupant of the vehicle is directed to the display unit 108a for a predetermined time or longer. When it is determined that the occupant of the vehicle has gazed at the display unit 108a (Step S14: YES), the process flow proceeds to Step S15. When it is determined that the occupant of the vehicle has not gazed at the display unit 108a (Step S14: NO), the process flow proceeds to Step S17.

In Step S15, the vehicular recording device 100 outputs information indicating a voice command to the occupant of the vehicle using the output unit 108. In an example of Step S15, text information indicating the voice command such as "recording start" or "ROKUGAISHI" is displayed on the display unit 108a serving as the output unit 108. The display unit 108a at which the occupant of the vehicle is determined to have gazed in Step S14 and the display unit 108a on which information indicating the voice command is displayed in Step S15 are the same display unit. In another example of Step S15, the voice output unit 108b serving as the output unit 108 is caused to output a voice indicating the voice command such as "ROKUGAISHI."

The processes of Steps S11, S12, S13, and S14 are started in parallel at the same time as starting of the process of Step S10 and are performed until the process flow in FIG. 2 ends.

In Step S16, the vehicular recording device 100 stores event data. Specifically, the recording control unit 208 stores the event data based on the first imaging data as overwriting-prohibited data. In Step S16, when it is determined in Step S11 that an operation for performing event recording has been performed, the first imaging data in 15 seconds or the like before and after the time point at which an operation for performing event recording has been performed is stored as event data. In Step S16, when it is determined in Step S12 that a voice command for performing event recording has been received, the first imaging data in 15 seconds or the like before and after the time point at which the voice command for performing event recording has been recognized is stored as event data. In Step S16, when it is determined in Step S13 that an event has been determined, the first imaging data in 15 seconds or the like before and after the time point at which the event has been determined is stored as event data.

When the determination result of Step S14 is NO, the vehicular recording device 100 determines whether a recording process or the like has ended (Step S17) after the process of Step S15 or the process of Step S16 has been performed. Specifically, the vehicular recording device 100 determines whether the process started in Step S10 has ended. End of the process started in Step S10 means that an operation of the vehicular recording device 100 ends by turning off the engine or the power supply of the vehicle which is a mobile object. When it is determined that the process has ended (Step S17: YES), the process flow illustrated in FIG. 2 ends. When it is determined that the process has not ended (Step S17: NO), the process flow proceeds to Step S11.

When an occupant such as a driver in the vehicle wants to record imaging data acquired by imaging an event such as an accident in which a host vehicle is not involved as event data, the occupant may want to store event data using a voice command. When the occupant is stirred up by a nearby vehicle or the like, the occupant may want to store event data using a voice command. In this case, an event is not determined in the process of Step S13. It may not be safe that a driver driving a vehicle performs an operation of performing event recording using the operation unit 114. An occupant, who does not reach the operation unit 114 of the vehicular recording device 100 with a hand, other than the driver has difficulty in performing the operation of performing event recording using the operation unit 113.

When event recording is instructed using a voice command, the voice command for instructing event recording may not come to mind instantaneously. Examples of such a case include a case in which the number of times event recording is instructed using a voice command is small and a case in which a plurality of vehicles are used and a voice command for instructing event recording for a vehicular recording device provided in a vehicle differs between the vehicles.

In this way, when an occupant such as a driver in the vehicle cannot instantaneously bring an exact voice command to mind or utters an erroneous voice command, the occupant of the vehicle often gazes at the vehicular recording device 100, particularly, the display unit 108a. At this time, by outputting a voice command for instructing event recording through the process flow illustrated in FIG. 2, an occupant of the vehicle can utter an appropriate voice command, and it is possible to reduce a delay of the timing at which event recording is performed and to appropriately perform event recording.

Second Embodiment

A second embodiment will be described below with reference to FIG. 3. The configuration of a vehicular recording device 100 according to the second embodiment is the same as in the first embodiment, and a description of details other than differences therefrom will be omitted.

The sightline determining unit 214 determines that the sightline of an occupant of the vehicle is successively directed to the display unit 108a a plurality of times. The plurality of successive times is, for example, a case in which the sightline of the occupant of the vehicle is directed to the display unit 108a two or more times for 3 seconds. The plurality of successive times may be, for example, a case in which it is determined a plurality of times that the sightline of the occupant is directed to the display unit 108a for a time or more in which it can be determined that the occupant has gazed at the display unit 108a, instead of a case in which the sightline of the occupant of the vehicle passes through the display unit 108a two or more times for 0.5 seconds. When a plurality of occupants in the vehicle are present, it is determined that the sightline of the same occupant is successively directed to the display unit 108a a plurality of times.

The processes of Steps S20 to S23 and Steps S25 to S27 in FIG. 3 are the same as the processes of Steps S10 to S13 and Steps S15 to S17 in FIG. 2, and thus a description thereof will be omitted.

In Step S24, the vehicular recording device 100 determines whether an occupant of the vehicle has gazed at the display unit 108a successively a plurality of times. Specifically, the sightline determining unit 214 determines whether the sightline of the occupant of the vehicle is directed to the display unit 108a successively a plurality of times. In other words, it is determined whether the sightline of the occupant of the vehicle is directed to the display unit 108a for a predetermined time or longer a plurality of times in a predetermined period. When it is determined that the occupant of the vehicle has gazed at the display unit 108a successively a plurality of times (Step S24: YES), the process flow proceeds to Step S25. When it is determined that the occupant of the vehicle has not gazed at the display unit 108a successively a plurality of times (Step S24: NO), the process flow proceeds to Step S27.

When an occupant such as a driver in the vehicle does not instantaneously bring an exact voice command to mind and utters an erroneous voice command, the occupant of the vehicle often gazes at the vehicular recording device 100, particularly, the display unit 108a, to ascertain whether event recording is performed, that is, whether the voice command is exact, after the occupant has gazed at the vehicular recording device 100, particularly, the display unit 108a, with intention of performing event recording.

At this time, by outputting a voice command for instructing event recording through the process flow illustrated in FIG. 3, an occupant of the vehicle can utter an appropriate voice command and it is possible to reduce a delay of the timing at which event recording is performed and to appropriately perform event recording.

Third Embodiment

A third embodiment will be described below with reference to FIG. 4. The configuration of a vehicular recording device 100 according to the third embodiment is the same as in the first embodiment, and a description of details other than differences therefrom will be omitted.

The voice recognizing unit 216 also recognizes a voice other than the voice command in addition to the voice command for the vehicular recording device 100. The voice other than the voice command has only to enable it to be determined whether another voice has been uttered instead of the voice command. When a voice corresponding to the voice command is recognized, the voice recognizing unit 216 outputs an instruction for performing event recording to the recording control unit 208. When a voice other than the voice command is recognized, the voice recognizing unit 216 outputs information indicating that a voice other than the voice command is recognized to the recording control unit 208.

The voice recognizing unit 216 does not need to normally output information indicating that a voice other than the voice command is recognized to the recording control unit 208. For example, when a voice other than the voice command is recognized in a period in which an occupant of the vehicle gazes at the display unit 108a or in a period of, for example, 3 seconds after the occupant of the vehicle has gazed at the display unit 108a, the voice recognizing unit 216 outputs information indicating that a voice other than the voice command has been recognized to the recording control unit 208.

The processes of Steps S30 to S34 and Steps S36 to S37 in FIG. 4 are the same as the processes of Steps S10 to S14 and Steps S15 to S17 in FIG. 2, and thus description thereof will be omitted.

When it is determined in Step S34 that an occupant of the vehicle has gazed at the display unit 108a (Step S34: YES), the process flow proceeds to Step S35. In Step S35, the vehicular recording device 100 determines whether a voice other than the voice command has been recognized (Step S35). Specifically, the voice recognizing unit 216 determines whether a voice other than the voice command has been recognized in a period in which the occupant of the vehicle gazes at the display unit 108a or in a predetermined period of, for example, 3 seconds after the occupant of the vehicle has gazed at the display unit 108a. When it is determined that a voice other than the voice command has been recognized (Step S35: YES), the process flow proceeds to Step S36. When it is determined that a voice other than the voice command has not been recognized (Step S35: NO), the process flow proceeds to Step S38.

In this way, when an occupant such as a driver in the vehicle does not instantaneously bring an exact voice command to mind, the occupant of the vehicle often utters a voice while gazing at the vehicular recording device 100. When this utterance matches the voice command, the determination result of Step S31 is YES. When the utterance is a voice other than the voice command, the voice command for instructing event recording is displayed on the display unit 108a through the process flow illustrated in FIG. 3, thus an occupant of the vehicle can utter an appropriate voice command and it is possible to reduce a delay of the timing at which event recording is performed and to appropriately perform event recording.

In Step S35 according to a modified example of the third embodiment, it may be determined whether a voice similar to the voice command has been recognized. A voice similar to the voice command is utterance of a word or phrase which does not perfectly match the voice command but partially matches the voice command.

In this case, the voice recognizing unit 216 compares an analysis result of the acquired voice with a voice command stored in advance and determines whether there is a word or phrase matching a word or phrase indicated by the voice command. The voice recognizing unit 216 may determine whether a specific word or phrase matches. For example, when the voice command is "recording start" and a voice including a word or phrase "recording" is uttered, it is determined that a voice similar to the voice command has been recognized.

In Step S35, the voice recognizing unit 216 may determine whether a synonym has been recognized as the voice similar to the voice command. For example, when the voice command is "recording start" and a voice including a word or phrase "recording" such as "recording start" or "event recording" is uttered, it is determined that a voice similar to the voice command has been recognized.

In this way, when an occupant such as a driver in the vehicle does not instantaneously bring an exact voice command to mind and utters an erroneous voice command, an occupant of the vehicle often gazes at the vehicular recording device 100, particularly, the display unit 108a. At this time, by displaying a voice command for instructing event recording on the display unit 108a through the process flow illustrated in FIG. 3, an occupant of the vehicle can utter an appropriate voice command and it is possible to reduce a delay of the timing at which event recording is performed and to appropriately perform event recording. By allowing a correct voice command to be uttered, it is also possible to cause understanding of the voice command and to prevent event recording from being unintentionally performed by an erroneous voice command.

Fourth Embodiment

Figure 5:
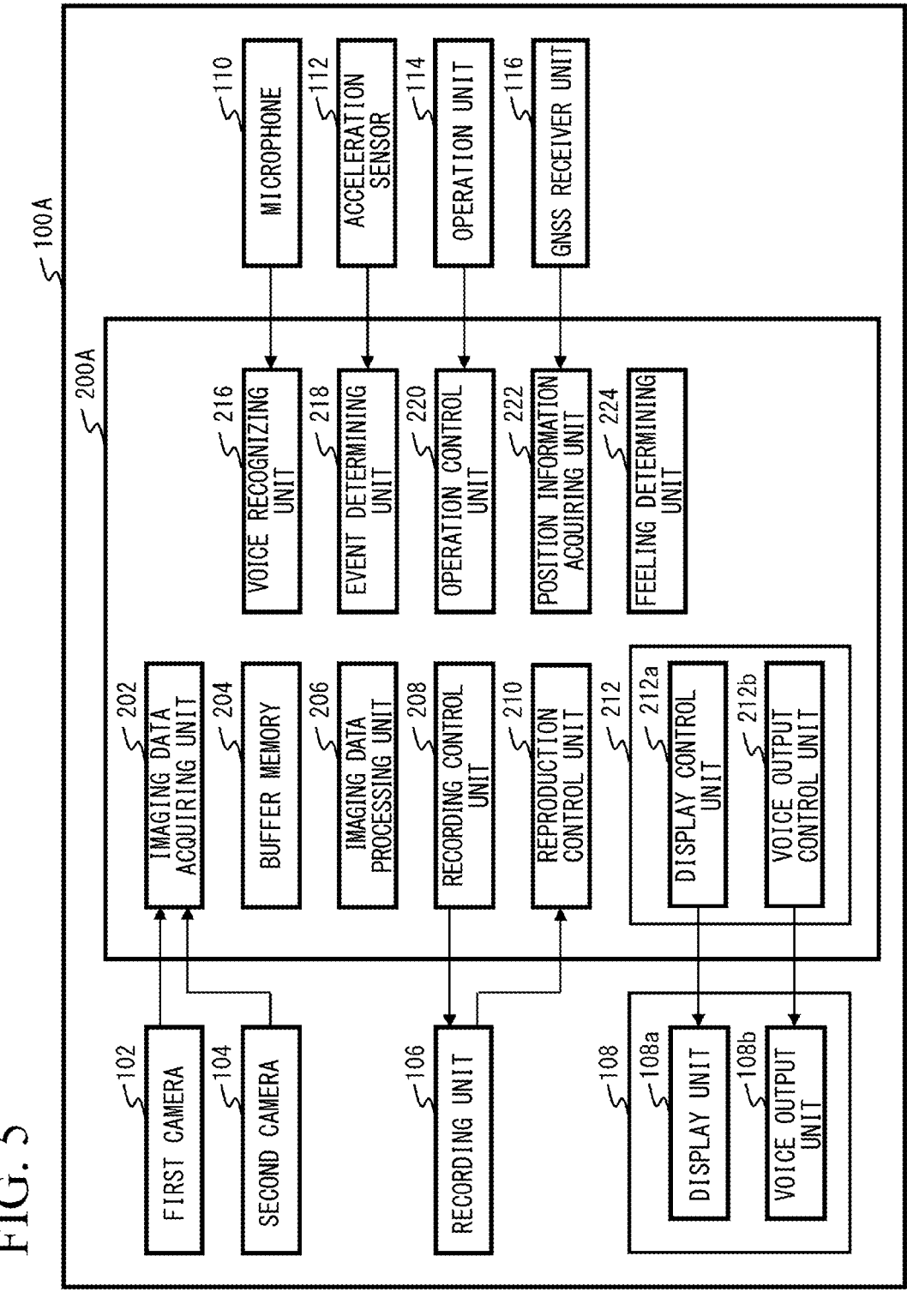
FIG. 5 is a block diagram illustrating a configuration of a vehicular recording device according to a fourth embodiment.

A fourth embodiment will be described below with reference to FIG. 5. The configuration of a vehicular recording device 100A according to the fourth embodiment is different from the vehicular recording device 100 according to the first embodiment in that the control unit 200 is replaced with a control unit 200A. The control unit 200A further includes a feeling determining unit 224 in comparison with the control unit 200. Out of elements of the vehicular recording device 100A according to the fourth embodiment, description of the same elements as in the vehicular recording device 100 according to the first embodiment will be omitted.

The control unit 200A includes at least a feeling determining unit 224 in addition to an imaging data acquiring unit 202, a buffer memory 204, an imaging data processing unit 206, a recording control unit 208, a reproduction control unit 210, an output control unit 212, a voice recognizing unit 216, an event determining unit 218, an operation control unit 220, and a position information acquiring unit 222 as constituents or functions to be realized. The output control unit 212 includes a display control unit 212a and a voice output control unit 212b.

The second camera 104 is provided at a position at which a face of an occupant of the vehicle can be imaged and a look or a sightline of the occupant of the vehicle can be determined. The second camera 104 is provided on a cabin side of the vehicular recording device 100 when the vehicular recording device 100 is provided in the cabin side of an upper part of the windshield of the vehicle and is provided integrally with the vehicular recording device 100.

When the second camera 104 is provided at a position at which a look or a sightline of a driver who is an occupant of the vehicle can be determined, the second camera 104 is provided, for example, in an instrument panel of the vehicle to capture an image in a direction in which a face of the driver in the vehicle is located. When the second camera 104 is provided at a position at which a look or a sightline of another occupant in addition to the driver of the vehicle can be determined, the second camera 104 may be provided, for example, in the vicinity or in a rearview mirror or the like of the vehicle to image the whole cabin.

The display unit 108a is a display device that displays various types of information under the control of the display control unit 212. The display unit 108a includes a display panel such as a liquid crystal panel or an organic electroluminescence (EL) panel. The display unit 108a may be provided integrally with the vehicular recording device 100 or may be connected thereto as a separate unit in a wired or wireless manner. The display unit 108a may be another device that is connected in a wireless manner and includes the display control unit 212a. The display unit 108a is disposed at a position which it is easy for an occupant of the vehicle to see.

The imaging data acquiring unit 202 acquires first imaging data from the first camera 102 and second imaging data from the second camera 104. The imaging data acquiring unit 202 outputs the first imaging data acquired from the first camera 102 to the buffer memory 204. When the feeling determining unit 224 determines a feeling on the basis of a look of an occupant of the vehicle, the imaging data acquiring unit 202 outputs the second imaging data acquired from the second camera 104 to the feeling determining unit 224.

The display control unit 212a controls the display unit 108a such that various types of information are displayed on the display unit 108a. When the display control unit 212a serves as the output control unit 212 and the feeling determining unit 224 determines that a feeling of an occupant is negative, the display control unit 212a displays information indicating a voice command for instructing event recording on the display unit 108a. When the voice command for instructing event recording is "recording start," the display control unit 212 displays information indicating the voice command such as "recording start" or "ROKUGAISHI" on the display unit 108a.

The voice output control unit 212b causes the voice output unit 108b to output various types of voices. When the voice output control unit 212b serves as the output control unit 212 and the feeling determining unit 224 determines that the feeling of the occupant is negative, the voice output control unit 212b causes the voice output unit 108b to output a voice indicating the voice command for instructing event recording. When the voice command for instructing event recording is "recording start," the voice output control unit 212b causes the voice output unit 108b to output a voice such as "ROKUGAISHI."

The feeling determining unit 224 performs a process of determining a feeling of an occupant of the vehicle. The feeling determining unit 224 determines the feeling of an occupant of the vehicle, for example, by determining an occupant of the vehicle from the second imaging data and analyzing the look of the face of the determined occupant. The feeling determining unit 224 determines the feeling of an occupant of the vehicle by analyzing a voice uttered by the occupant of the vehicle and acquired by the voice recognizing unit 216. Known methods can be employed for any method.

When a feeling of an occupant of the vehicle is determined from the second imaging data, the feeling determining unit 224 acquires movement of an eye or a mouse of a face of the occupant and determines feelings such as happiness, calmness, anger, and fear using a trained model having learned movement of various constituents of a face through machine learning. When the feeling determined from the look of the occupant of the vehicle is anger or fear, the feeling determining unit 224 determines that the feeling is negative.

When a feeling of an occupant of the vehicle is determined from a voice uttered by the occupant of the vehicle, the feeling determining unit 224 acquires content, intonation, and the like of a voice uttered by the occupant and determines feelings such as happiness, calmness, anger, and fear using a trained model having learned content, intonation, and the like of various voices through machine learning. When the feeling determined from the voice uttered by the occupant of the vehicle is anger or fear, the feeling determining unit 224 determines that the feeling is negative.

When the feeling of the occupant of the vehicle indicates anger, fear, or surprise continuously in a predetermined period of, for example, 60 seconds or longer, the feeling determining unit 224 may determine that the feeling is negative.

A flow of a recording process which is performed by the vehicular recording device 100 will be described below with reference to FIG. 2. The recording process performed by the vehicular recording device 100 is performed on the basis of a program by the control unit 200A which is a computer serving as the vehicular recording control device.

Start of a process in FIG. 2 means that the vehicular recording device 100 starts its operation, for example, by turning on an engine or a power supply of a vehicle which is a mobile object.

When the process is started, the vehicular recording device 100 starts a normal recording process and a sightline determining process (Step S40). Specifically, the recording control unit 208 starts the normal recording process of recording imaging data based on first imaging data on the recording unit 106, and the sightline determining unit 214 starts determination of a feeling of an occupant of the vehicle from second imaging data.

When the process of Step S40 is started, the vehicular recording device 100 determines whether an operation for performing event recording has been performed (Step S41). Specifically, the operation control unit 220 determines whether an operation on a button or an icon for performing event recording is received by the operation unit 114. When it is determined that an operation for performing event recording has been performed (Step S41: YES), the process flow proceeds to Step S46. When it is determined that an operation for performing event recording has not been performed (Step S41: NO), the process flow proceeds to Step S42.

In Step S42, the vehicular recording device 100 determines whether a voice command for performing event recording has been received. Specifically, the voice recognizing unit 216 determines whether a voice indicating the voice command for performing event recording is included in a voice acquired by the microphone 110. When it is determined that a voice command for performing event recording has been received (Step S42: YES), the process flow proceeds to Step S46. When it is determined that a voice command for performing event recording has not been received (Step S42: NO), the process flow proceeds to Step S44.

In Step S43, the vehicular recording device 100 determines whether an event has been determined. Specifically, the event determining unit 218 determines whether an event has been determined on the basis of acceleration determined by the acceleration sensor 112. When it is determined that an event has been determined (Step S43: YES), the process flow proceeds to Step S46. When it is determined that an event has not been determined (Step S43: NO), the process flow proceeds to Step S44.

In Step S44, the vehicular recording device 100 determines whether a feeling of the occupant of the vehicle is negative. Specifically, the feeling determining unit 224 determines whether the feeling of the occupant of the vehicle is negative on the basis of a look or an uttered voice of the occupant of the vehicle. When the vehicle is driven, an occupant having a negative feeling, that is, an occupant feeling anger, fear, or surprise, is often a driver of the vehicle. This is because the driver can easily ascertain dangers in driving the vehicle. This is also because the driver of the vehicle often utters a voice command for instructing event recording. Accordingly, determination of whether the feeling of the occupant of the vehicle is negative may be replaced with determination of whether the feeling of the driver in the vehicle is negative. An occupant of the vehicle may be an occupant other than the driver in the vehicle. The feeling determining unit 224 may determine whether the feeling of the occupant of the vehicle is negative for a predetermined time or longer.

When it is determined in Step S44 that the feeling of the occupant of the vehicle is negative (Step S44: YES), the process flow proceeds to Step S45. When it is determined that the feeling of the occupant of the vehicle is not negative (Step S44: NO), the process flow proceeds to Step S47.

In Step S45, the vehicular recording device 100 outputs information indicating a voice command to the occupant of the vehicle using the output unit 108. In an example of Step S45, text information indicating the voice command such as "recording start" or "ROKUGAISHI" is displayed on the display unit 108*a* serving as the output unit 108. In another example of Step S45, the voice output unit 108*b* serving as the output unit 108 is caused to output a voice indicating the voice command such as "ROKUGAISHI."

The processes of Steps S41, S42, S43, and S44 are started in parallel at the same time as starting of the process of Step S40 and are performed until the process flow in FIG. 2 ends.

In Step S46, the vehicular recording device 100 stores event data. Specifically, the recording control unit 208 stores the event data based on the first imaging data as overwriting-prohibited data. In Step S46, when it is determined in Step S41 that an operation for performing event recording has been performed, the first imaging data in 15 seconds or the like before and after the time point at which an operation for performing event recording has been performed is stored as event data. In Step S46, when it is determined in Step S42 that a voice command for performing event recording has been received, the first imaging data in 15 seconds or the like before and after the time point at which the voice command for performing event recording has been recognized is stored as event data. In Step S46, when it is determined in Step S43 that an event has been determined, the first imaging data in 15 seconds or the like before and after the time point at which the event has been determined is stored as event data.

When the determination result of Step S44 is NO, the vehicular recording device 100 determines whether a recording process or the like has ended (Step S47) after the process of Step S45 has been performed and after the process of Step S16 has been performed. Specifically, the vehicular recording device 100 determines whether the process started in Step S40 has ended. End of the process started in Step S40 means that an operation of the vehicular recording device 100 ends by turning off the engine or the power supply of the vehicle which is a mobile object. When it is determined that the process has ended (Step S47: YES), the process flow illustrated in FIG. 2 ends. When it is determined that the process has not ended (Step S47: NO), the process flow proceeds to Step S41.

When an occupant such as a driver in the vehicle wants to record imaging data acquired by imaging an event such as an accident in which a host vehicle is not involved as event data, the occupant may want to store event data using a voice command. When the occupant is stirred up by a nearby vehicle or the like, the occupant may want to store event data using a voice command. In this case, an event is not determined in the process of Step S43. It may not be safe that a driver driving a vehicle performs an operation of performing event recording using the operation unit 114. An occupant, who does not reach the operation unit 114 of the vehicular recording device 100 with a hand, other than the driver has difficulty in performing the operation of performing event recording using the operation unit 113.

When event recording is instructed using a voice command, the voice command for instructing event recording may not come to mind instantaneously. Examples of such a case include a case in which the number of times event recording is instructed using a voice command is small and a case in which a plurality of vehicles are used and a voice command for instructing event recording for a vehicular recording device provided in a vehicle differs between the vehicles.

In this way, when an occupant such as a driver in the vehicle feels a negative feeling such as fear or surprise due to occurrence of an accident or the like in the vicinity of the host vehicle or feels a negative feeling such as anger or fear due to being stirred up by another vehicle, it is highly necessary to perform event recording. In this case, the occupant may not instantaneously bring an exact voice command to mind or may utter an erroneous voice command. At this time, by outputting a voice command for instructing event recording through the process flow illustrated in FIG. 2, the occupant of the vehicle can utter an appropriate voice command, and it is possible to reduce a delay of the timing at which event recording is performed and to appropriately perform event recording.

Fifth Embodiment

Figure 7:
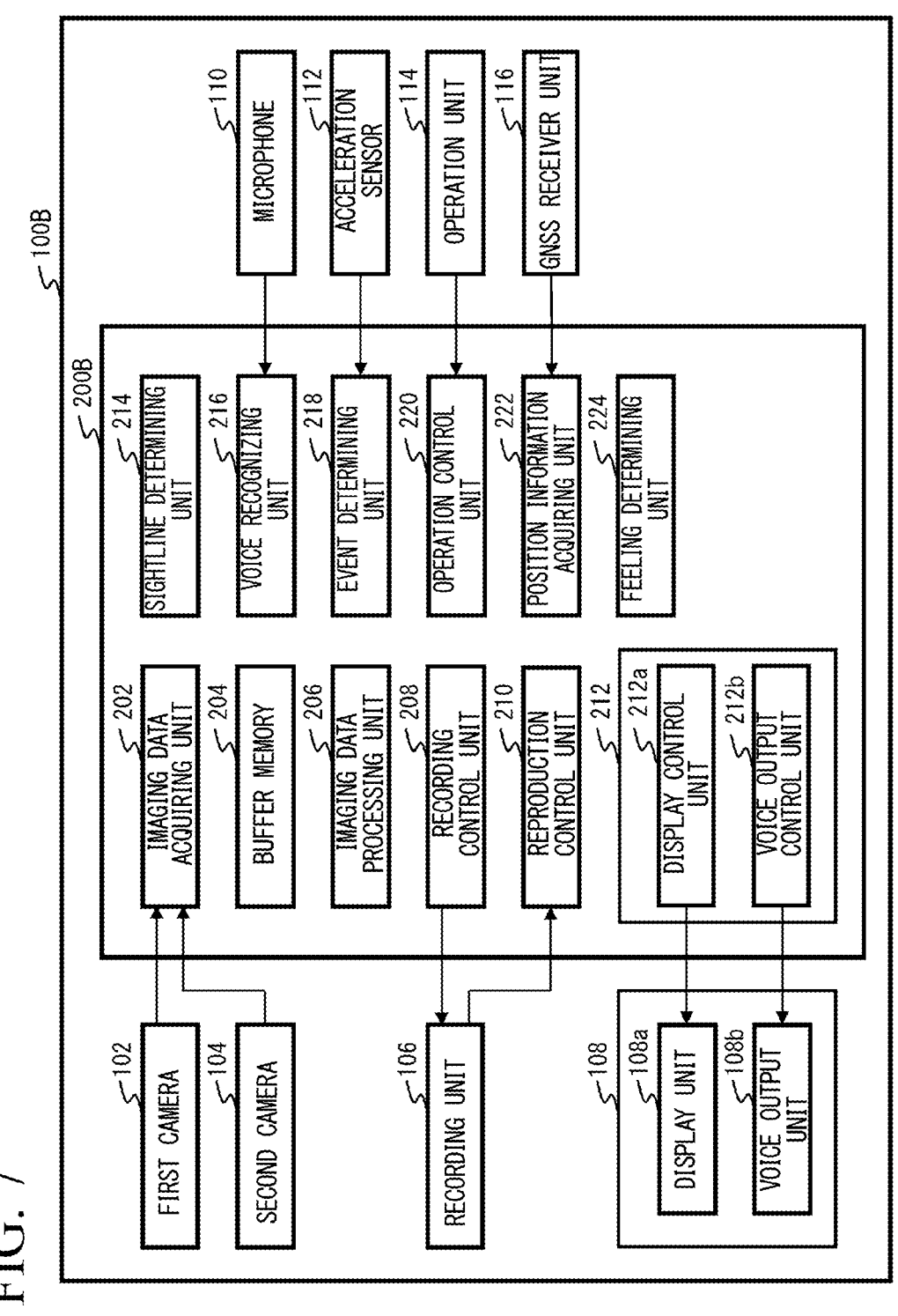
FIG. 7 is a block diagram illustrating a configuration of a vehicular recording device according to a fifth embodiment.

A fifth embodiment will be described below with reference to FIG. 7. The configuration of a vehicular recording device 100B according to the fifth embodiment is different from the vehicular recording device 100A according to the fourth embodiment in that the control unit 200A is replaced with a control unit 200B. The control unit 200B further includes a sightline determining unit 214 in comparison with the configuration of the control unit 200A. Description of the same elements as in the vehicular recording device 100A according to the fourth embodiment out of elements of the vehicular recording device 100B according to the fifth embodiment will be omitted.

The sightline determining unit 214 determines a direction of a sightline of an occupant of the vehicle from the second imaging data acquired from the imaging data acquiring unit 202. When the second camera 104 is provided to image a driver of the vehicle, the sightline determining unit 214 determines a direction of a sightline of the driver in the vehicle captured in the second imaging data. When the second camera 104 is provided at a position at which the whole cabin can be imaged and an occupant other than the driver is in the vehicle, the sightline determining unit 214 determines a direction of a sightline of an occupant other than the driver in addition to determination of the direction of the sightline of the driver in the vehicle.

The sightline determining unit 214 determines a face of a person from the second imaging data and determines a position of an eye in the determined face. Determination of a face or an eye by the sightline determining unit 214 is performed using an arbitrary method such as pattern matching. The sightline determining unit 214 performs determination of a sightline direction based on a positional relationship between an eye inner corner and an iris determined from an image of eyes or determination of a sightline direction based on a positional relationship between corneal reflection and pupils. The sightline determining method is not limited to the aforementioned method, and can employ an arbitrary method.

The sightline determining unit 214 determines that a sightline of an occupant of the vehicle tends to gaze at the outside of the vehicle. The sightline determining unit 214 determines that a sightline of an occupant of the vehicle tends to gaze at the outside of the vehicle on the basis of data indicating a positional relationship between the second camera 104 and the windshield, the side window, or the like of the vehicle stored in advance. The outside of the vehicle includes a forward direction of the vehicle. For example, this is because an occupant of a vehicle tends to gaze at an accident when the accident or the like occurs in the vicinity of the vehicle.

When it is determined that an occupant of the vehicle tends to gaze at an inner mirror provided in the vehicle or a display device having a function of the inner mirror on the basis of the sightline of the occupant, the sightline determining unit 214 may determine that the occupant gazes at the outside of the vehicle. The sightline determining unit 214 determines that the occupant of the vehicle tends to gaze at the outside of the vehicle on the basis of data indicating a positional relationship between the second camera 104 and the inner mirror of the vehicle or the display device having the function of the inner mirror stored in advance. For example, this is because that an occupant of the vehicle tends to gaze at the rear side of the vehicle, that is, the outside of the vehicle, using the inner mirror or the like when the occupant is stirred up by a rear vehicle.

Here, gazing means that, for example, a sightline of an occupant of the vehicle is directed to the outside of the vehicle for a predetermined time such as 5 seconds or longer. When the sightline of an occupant of the vehicle is directed to the outside of the vehicle and a change in the direction of the sightline is small, the sightline determining unit 214 may determine that the occupant tends to gaze at the outside of the vehicle. The direction of the sightline when an occupant gazes at the outside of the vehicle over the windshield or the side window of the vehicle may be based on the premise that a change in the direction of the sightline with respect to the vehicle is absolutely small or may be based on the premise that a change in the direction of the sightline with respect to the vehicle is relatively small when the positional relationship with respect to a site of an accident changes due to traveling of the vehicle.

The sightline determining unit 214 may determine that an occupant of the vehicle tends to gaze at the outside of the vehicle when a sightline of the occupant of the vehicle is successively directed to the outside of the vehicle a plurality of times. The plurality of successive times is, for example, a case in which the sightline of the occupant of the vehicle is directed to the outside of the vehicle two or more times for 3 seconds. When a plurality of occupants in the vehicle are present, it is determined that a sightline of the same occupant is successively directed to the outside of the vehicle a plurality of times.

A flow of a recording process which is performed by the vehicular recording device 100B will be described below with reference to FIG. 8. The recording process performed by the vehicular recording device 100B is performed on the basis of a program by the control unit 200B which is a computer serving as the vehicular recording control device.

The processes of Steps S50 to S54, Step S56, and Steps S57 to S58 in FIG. 8 are the same as the processes of Steps S40 to S44, Step S45, and Steps S46 to S47 in FIG. 6, and thus description thereof will be omitted.

When it is determined in Step S54 that the feeling of the occupant of the vehicle is negative (Step S54: YES), the process flow proceeds to Step S55. In Step S55, the vehicular recording device 100 determines whether the occupant of the vehicle tends to gaze at the outside of the vehicle, that is, whether the sightline of the occupant of the vehicle tends to be directed to the outside of the vehicle. When it is determined that the sightline of the occupant of the vehicle tends to be directed to the outside of the vehicle (Step S55: YES), the process flow proceeds to Step S56. When it is determined that the sightline of the occupant of the vehicle tends not to be directed to the outside of the vehicle (Step S55: NO), the process flow proceeds to Step S58.

In this way, when an occupant such as a driver in the vehicle feels a negative feeling such as fear or surprise due to occurrence of an accident or the like in the vicinity of the host vehicle or feels a negative feeling such as anger or fear due to being stirred up by another vehicle and the occupant tends to gaze at an object of the accident or the aftereffect thereof, it is highly necessary to perform event recording. In this case, the occupant may not instantaneously bring an exact voice command to mind or may utter an erroneous voice command. At this time, by outputting a voice command for instructing event recording through the process flow illustrated in FIG. 4, the occupant of the vehicle can utter an appropriate voice command, and it is possible to reduce a delay of the timing at which event recording is performed and to appropriately perform event recording.

The present invention is not limited to the aforementioned embodiments and can be appropriately modified without departing from the gist thereof. A program for causing a computer to perform the aforementioned processes can be stored using various types of non-transitory computer-readable media and be supplied to a computer serving as a vehicular recording control device.

INDUSTRIAL APPLICABILITY

The present invention can be applied to a vehicular recording device such as a so-called drive recorder.

REFERENCE SIGNS LIST 100, 100A, 100B Vehicular recording device
102 First camera
104 Second camera
106 Recording unit
108 Output unit
108a Display unit
108b Voice output unit
110 Microphone
112 Acceleration sensor
114 Operation unit
116 GNSS receiver unit
200, 200A, 200B Control unit (vehicular recording control device)
202 Imaging data acquiring unit
204 Buffer memory
206 Imaging data processing unit
208 Recording control unit
210 Reproduction control unit
212 Output control unit
212a Display control unit
212b Voice output control unit
214 Sightline determining unit
216 Voice recognizing unit
218 Event determining unit
220 Operation control unit
222 Position information acquiring unit
224 Feeling determining unit

What is claimed is:

1. A vehicular recording control device comprising:
a processor coupled to a memory storing instructions for the processor to execute:
acquiring first imaging data from a first camera imaging surroundings of a vehicle and second imaging data from a second camera imaging a cabin of the vehicle;
determining a direction of a sightline of an occupant of the vehicle from the second imaging data;
recognizing a voice command for instructing event recording and a voice other than the voice command;
outputting information indicating the voice command to the occupant when the determining of the direction of the sightline determines that the sightline of the occupant is directed to a display unit and the recognizing the voice includes recognizing a voice based on speech other than the voice command in a period in which the sightline of the occupant is directed to the display unit or in a predetermined period after the sightline of the occupant has been directed to the display unit; and
a storage configured to store the first imaging data as event data when the recognizing of the voice command recognizes the voice command.

2. The vehicular recording control device according to claim 1, wherein the outputting information includes indicating the voice command to the occupant when determining the direction determines that the sightline of the occupant is directed to the display unit for a predetermined time or longer.

3. The vehicular recording control device according to claim 1, wherein the outputting information includes indicating the voice command to the occupant when the determining of the direction of the sightline determines that the sightline of the occupant is continuously directed to the display unit a plurality of times.

4. The vehicular recording control device according to claim 1, wherein the outputting information includes indicating the voice command to the occupant when the determining of the direction of the sightline determines that the sightline of the occupant is directed to the display unit and the recognizing of the voice command recognizes a voice partially matching the voice command or a synonym with the voice command as speech other than the voice command.

5. The vehicular recording control device according to claim 1, wherein the outputting information includes indicating a same voice as the voice command to the occupant from a speaker such that the voice is easy for the occupant to understand and is not input to a microphone acquiring the voice command.

6. The vehicular recording control device according to claim 5, wherein the outputting information includes outputting the same voice as the voice command to the occupant from a speaker that is provided above a seat on which the occupant sits or a neck speaker that is worn by the occupant.

7. A recording method that is performed by a vehicular recording control device, the recording method comprising:
acquiring first imaging data from a first camera imaging surroundings of a vehicle and second imaging data from a second camera imaging a cabin of the vehicle;
determining a direction of a sightline of an occupant of the vehicle from the second imaging data;
recognizing a voice command for instructing event recording and a voice other than the voice command;
outputting information indicating the voice command to the occupant when it is determined that the sightline of the occupant is directed to a display unit and the recognizing the voice command includes recognizing a voice based on speech other than the voice command in a period in which the sightline of the occupant is directed to the display unit or in a predetermined period after the sightline of the occupant has been directed to the display unit; and
storing the first imaging data as event data when the voice command is recognized.

* * * * *